United States Patent Office 3,462,456
Patented Aug. 19, 1969

3,462,456
METHYLENEDIOXY PHENYL ACETAMIDES
Heinrich Leditschke, Frankfurt am Main, Gustav Ehrhart and Heinrich Ruschig, Bad Soden, Taunus, and Willi Meixner, Hofheim, Taunus, Germany, assignors to Farbwerke Hoechst Aktiengesellschaft vormals Meister Lucius & Bruning, Frankfurt am Main, Germany, a corporation of Germany
No Drawing. Filed Aug. 7, 1967, Ser. No. 658,643
Claims priority, application Germany, Aug. 13, 1966, F 49,938
Int. Cl. C07d 13/00
U.S. Cl. 260—340.5          8 Claims

ABSTRACT OF THE DISCLOSURE

Substituted phenyl acetic acid amides having sedative properties.

It has been found that compounds of the general formula

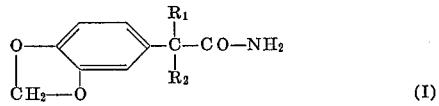

in which $R_1$ and $R_2$ represent the same or different saturated or unsaturated aliphatic hydrocarbon radicals of 1–4 carbon atoms can be obtained, (a) by saponifying substituted phenyl acetonitriles of the general formula

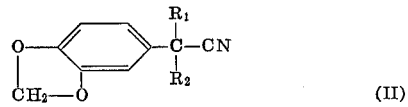

or
(b) by reacting substituted phenyl acetic acids of the general formula

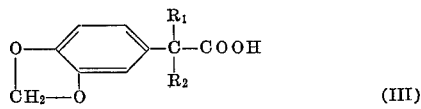

or their functional derivatives capable of reacting, with ammonia, or
(c) by dehydrogenating ammonia salts of the substituted phenyl acetic acids of the general Formula III or,
(d) by hydrogenating by means of a catalyst compounds of the general formula

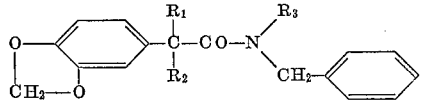

in which $R_3$ represents a hydrogen atom or a benzyl radical.

The preparation of the dialkyl-phenyl-acetonitriles of Formula II used as starting substances is carried out by alkylation of the corresponding phenyl-acetonitriles as is described in the German Auslegeschrift No. 1,242,618. Saponification of the acetonitriles according to method (a) of the process of the present invention is carried out, preferably by means of lyes. Advantageously, alkali lyes such as a sodium hydroxide solution or a caustic potash solution are used and working is effected in an aqueous alcohol or aqueous-alcoholic solution. As alcohols preferably low aliphatic alcohols such as methanol, ethanol or propanol can be used. Saponification is preferably carried out in a pressure vessel at elevated temperatures at 100–200° C., preferably at 130–180° C. Usually it is heated for several hours, the reaction period depending on the temperature applied. At low temperatures heating is continued for about 6–10 hours, whereas at about 160° C. usually 5 hours are sufficient. Working up of the reaction mixture is effected in usual manner, the alkaline solution is extracted for example by means of an organic solvent the small amounts of phenyl acetic acids which possibly form remaining in the alkaline solution.

According to method (b) corresponding substituted phenyl acetic acids or their functional derivatives capable of reacting are reacted with ammonia. The phenyl acetic acids used as starting substances are obtained by heating for several hours the corresponding nitriles or amides in an alkaline medium. As functional derivatives capable of reacting, preferably the corresponding acid chlorides, acid bromines as well as the corresponding alkyl or phenyl esters are used. The halides and esters are obtained in usual manner from the corresponding carboxylic acids.

The acid halides are reacted with alcoholic ammonia, and the mixture is advantageously abandoned for several hours at room temperature. Reaction can also be terminated by heating to slightly elevated temperatures. The reaction of the corresponding phenyl acetic acid esters takes a little longer than that of the halides and is effected advantageously at elevated temperatures, preferably in a pressure vessel. As esters in particular low alkyl esters such as methyl or ethyl esters as well as phenyl esters can be used. As acid derivatives capable of reacting mixed acid anhydride can be applied, which are obtained from the corresponding substituted phenyl acetic acids with chloroformic acid esters in the presence of tertiary amines for example triethylamine or tributylamine.

The products of the invention according to method (c) can also be obtained by dehydrogenation of the ammonium salts of the correspondingly substituted phenyl acetic acids. Dehydrogenation is carried out either by heating for a prolonged period of time to elevated temperatures or by reaction of agents splitting off water such as acetic acid anhydride.

Finally, the products of the invention according to method (d) can be obtained from the mono- or dibenzylamides of the general Formula V; they are obtained for example by reacting acid halides with benzyl- or dibenzyl amine. Splitting off of the benzyl radical is advantageously effected by means of catalytical hydrogenation, as catalysts precious metals of the 8th group of the periodical sysem, preferably palladium and platinum catalysts being used. Hydrogenation is carried out in the usual manner in the presence of organic solvents, for example low aliphatic alcohols having 1 to 4 carbon atoms such as methanol, ethanol, propanol, isopropanol or acetic acid.

The products of the invention have valuable therapeutical properties and can be used as medicament. Thus they are distinguished for example by excellent sedative properties which are superior to those of known soporifics even as to their period of effect.

The products of the process, if desired or required in admixture with pharmaceutically usual carriers, may be orally or parenterally administered. When orally administered, the products are preferably used in form of tablets or dragees. For this purpose the products are worked up with the usual carriers such as lactose, starch, tragacanth and magnesium stearate.

The following examples serve to illustrate the invention but they are not intended to limit it thereto.

Example 1

217 g. (1 mol.) of (3.4-methylene-dioxy-phenyl)-diethyl-aceto-nitrile described in DAS 1,242,618, Example 9, are dissolved with 224 g. of caustic alkali in 300 cc. of water and 500 cc. of alcohol, and heated for 4½ hours to 150° C. in a shaking device. 500 cc. of water are added to the reaction product and the alcohol is evaporated in vacuo. The residue is extracted by shaking with methylene chloride, dried over potassium carbonate and distilled in high vacuo. There are obtained 140 g. of 3.4-methylene-dioxy-phenyldiethyl-acetic acid amide boiling at 175–180° C. under a pressure of 0.5 mm. of mercury, which when triturated with cyclohexane solidify to colourless crystals melting at 94–95° C.

Example 2

82 g. of (3.4-methylene-dioxy-phenyl)-dipropyl-acetonitrile described in DAS 1,242,618, Example 10, are dissolved with 80 g. of caustic alkali in 80 cc. of water and 160 cc. of alcohol, and heated for 10 hours to 130° C. in a shaking device. After working up as described in Example 1 there are obtained 29 g. of 3.4-methylenedioxy-phenyl-dipropyl-acetic acid amide boiling at 196–197° C. under a pressure of 1.8 mm. of mercury which when triturated with cyclohexane solidifying to colourless crystals melting at 124° C.

Example 3

200 g. of (3.4-methylenedioxy-phenyl)-dibutyl-acetonitrile are dissolved with 185 g. of caustic alkali in 185 cc. of water and 370 cc. of alcohol, and heated for 8 hours in a shaking device to 130° C. After working up as described in Example 1, there are obtained 41 g. of 3.4-methylene-dioxy-phenyl-dibutyl-acetic acid amide boiling at 192–197° C. under a pressure of 1 mm. of mercury as an oil which when triturating with cyclohexane yields colourless crystals melting at 123–124° C.

Example 4

81.9 g. of (3.4-methylenedioxy-phenyl)-diisobutyl-acetonitrile are dissolved with 67.2 g. of caustic alkali in 67.2 cc. of water with 134.4 cc. of alcohol and heated for 8 hours in a shaking device to 140° C. After working up as described in Example 1 there are obtained 45 g. of 3.4-methylenedioxy-phenyl-di-isobutyl acetic acid amide boiling at 165–170° C. under a pressure of 2 mm. of mercury as an oil which when triturated yield crystals melting at 50° C.

The (3.4 - methylene-dioxy-phenyl)-di-isobutyl-acetonitrile serving as starting substance is obtained from 3.4-methylene-dioxy-butylcyanide by reaction of 2 mols of isobutylbromide in the presence of 2 mols of sodium amide.

Example 5

150.5 g. (0.5 mol) of 3.4-methylenedioxy-phenyl)-di-isoamyl-acetonitrile are dissolved with 112 g. of caustic alkali, 112 cc. of water and 224 cc. of alcohol and heated for 8 hours in a shaking device to 160° C. Working up is carried out as described in Example 1. There are obtained 50 g. of 3.4-methylene-dioxy-phenyl-di-isoamyl-acetic acid amide boiling at 190–200° C. under a pressure of 0.5 mm. of mercury as an oil which, when triturated with cyclohexane yields crystals melting at 136° C.

The (3.4 - methylenedioxy-phenyl)-di-isoamyl-acetonitrile boiling at 195° C. under a pressure of 3 mm. of mercury serving as starting substance is obtained from 3.4-methylenedioxybenzylcyanide by reaction of 2 mols of isoamylbromide in the presence of 2 mols of sodium amide.

Example 6

160 g. of (3.4-methylenedioxy-phenyl)-di-allyl-acetonitrile are heated in a shaking device for 8 hours to 140° C. with 160 g. of caustic alkali, which is dissolved in 160 cc. of water and 320 cc. of alcohol. After working up as described in Example 1 there are obtained 44 g. of (3.4-methylene-dioxy-phenyl)-di-allyl-acetic acid amide boiling at 200–204° C. under a pressure of 1.5 mm. of mercury which after triturating with cyclohexane yield colourless crystals melting at 101–102° C.

The (3.4 - methylene-dioxy-phenyl)-di-allyl-acetonitrile boiling at 140–143° C. under a pressure of 0.7 mm. of mercury serving as starting substance is obtained from 3.4-methylene-dioxy-benzyl-cyanide by reaction of 2 mols of allyl bromide in the presence of 2 mols of sodium amide.

Example 7

107.6 g. (0.4 mol) of (3.4-methylenedioxy-phenyl)-dimethallyl acetonitrile are dissolved with 95.6 g. of caustic alkali in 96 cc. of water and 192 cc. of alcohol and heated for 5 hours in a shaking device to 160° C. After working up as described in Example 1 there are obtained 44 g. of 3.4-methylene-dioxy—phenyl-di-methallyl acid amide boiling at 186–195° C. under a pressure of 0.8 mm. of mercury as an oil which when triturated with cyclohexane yields colourless crystals melting at 108–109° C.

The (3.4-methylenedioxy-phenyl)-dimethallyl-acetonitrile (boiling at 165–167° C. under a pressure of 1 mm. of mercury) serving as starting substance is obtained from 3.4-methylene-dioxy-benzylcyanide by reaction of 2 mols of methallyl chloride in the presence of 2 mols of sodium amide.

We claim:
1. A compound having the formula

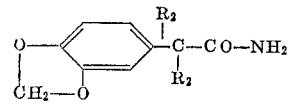

in which $R_1$ and $R_2$ represent the same or different saturated or unsaturated aliphatic hydrocarbon radicals of 1–4 carbon atoms.

2. A compound as defined in claim 1 in which $R_1$ and $R_2$ mean ethyl.
3. A compound as defined in claim 1 in which $R_1$ and $R_2$ mean propyl.
4. A compound as defined in claim 1 in which $R_1$ and $R_2$ mean butyl.
5. A compound as defined in claim 1 in which $R_1$ and $R_2$ mean isobutyl.
6. A compound as defined in claim 1 in whcih $R_1$ and $R_2$ mean isoamyl.
7. A compound as defined in claim 1 in which $R_1$ and $R_2$ mean allyl.
8. A compound as defined in claim 1 in which $R_1$ and $R_2$ mean methallyl.

References Cited

UNITED STATES PATENTS 2,362,168  11/1944  Gertler et al. ____ 260—340.5 X

FOREIGN PATENTS 1,486,029  5/1967  France.

ALEX MAZEL, Primary Examiner

J. H. TURNIPSEED, Assistant Examiner

U.S. Cl. X.R.

260—999

UNITED STATES PATENT OFFICE
CERTIFICATE OF CORRECTION

Patent No. 3,462,456     Dated August 19, 1969

Inventor(s) Heinrich Leditschke, Gustav Ehrhart and Heinrich Ruscl and Willi Meixner It is certified that error appears in the above-identified patent and that said Letters Patent are hereby corrected as shown below:

Column 4, line 35 (claim 1), the formula

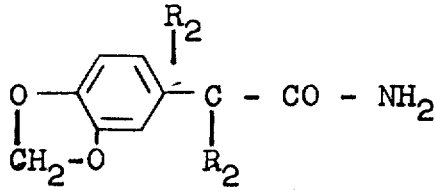   should read   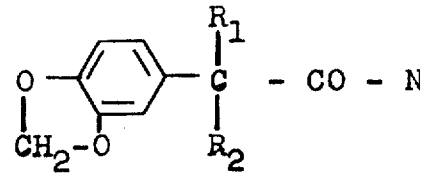

SIGNED AND SEALED

DEC 2 - 1969

(SEAL)
Attest:

Edward M. Fletcher, Jr.
Attesting Officer

WILLIAM E. SCHUYLER, JR.
Commissioner of Patents